US005386721A

United States Patent [19]

Alvizar

[11] Patent Number: 5,386,721

[45] Date of Patent: Feb. 7, 1995

[54] DIAGNOSTIC TOOL

[76] Inventor: Jacinto G. Alvizar, 7565 Lankershin, North Hollywood, Calif. 91605

[21] Appl. No.: 151,959

[22] Filed: Nov. 15, 1993

[51] Int. Cl.[6] ........................ G01M 15/00; G01F 1/00; F02M 65/00

[52] U.S. Cl. ........................................ 73/116; 73/113; 73/118.1

[58] Field of Search ........................ 73/113, 116, 117.1, 73/117.2, 117.3, 118.1, 119 A

[56] References Cited

U.S. PATENT DOCUMENTS

| | | | |
|---|---|---|---|
| 2,062,173 | 11/1936 | Haskins | 73/118.1 |
| 2,073,243 | 3/1937 | Liddell et al. | 73/118.1 |
| 2,201,019 | 5/1940 | Zotter | 73/113 |
| 2,215,680 | 9/1940 | Wiley et al. | 73/113 |
| 2,859,612 | 11/1958 | Morse | 73/113 |
| 3,292,428 | 12/1966 | Motl | 73/118.1 |
| 3,400,577 | 9/1968 | List | 73/113 |
| 4,253,332 | 3/1981 | Sabatino et al. | 73/113 |
| 4,552,015 | 11/1985 | Emmett et al. | 73/113 |
| 4,612,804 | 9/1986 | Colonnello | 73/113 |
| 4,809,544 | 3/1989 | Magoolaghan | 73/118.1 |

*Primary Examiner*—Hezron E. Williams
*Assistant Examiner*—George M. Dombroske
*Attorney, Agent, or Firm*—Julius L. Rubinstein

[57] ABSTRACT

The diagnostic of the class described has a tank for holding an auxiliary fuel supply. A fuel pump is mounted in the tank. The fuel pump is provided with a fuel inlet and a fuel outlet. A conduit leads from the fuel outlet of the fuel pump to the motor fuel lines. In this way operation of the fuel pump forces fuel into the motor fuel lines through the conduit. An adjustable valve is connected to the conduit for adjusting the fuel flow into the motor. A fuel flow meter is connected to the adjustable valve so that the valve can be adjusted until the fuel flow meter indicates that the fuel flow into the motor using the diagnostic tool is the same as the fuel flow when the motor is operating without the diagnostic tool.

5 Claims, 1 Drawing Sheet

DIAGNOSTIC TOOL

This invention relates to a diagnostic tool, and more particularly to a diagnostic tool for locating problems in the fuel supply systems of internal combustion motors.

FEDERALLY SPONSORED RESEARCH

No part of this patent application was developed with the aid of any federally sponsored research and development.

BACKGROUND AND RELATED ART

Time is money to mechanics and it is important for them to be able to diagnose a problem as soon as possible. There are in general two kinds of fuel systems for internal combustion motors. These motors use fuel injectors or carburetors. Both of these systems require fuel pumps and electrical control systems connected to the fuel pumps for their operation. If an internal combustion motor is not operating properly, or at all, it is important to be able to diagnose the problem as soon as possible. Depending on the fuel supply system for the motor, the problem could be in the fuel injectors or the carburetor, or the fuel pumps, or the electrical control systems which are connected to the fuel pumps. To determine this the fuel injectors or carburetors, depending on the motor, have to be examined to determine if they are defective or not. If they are not defective, the attention of the mechanic will be directed to the fuel pumps and their attached electrical control systems.

DESCRIPTION OF PRIOR ART

In the past a number of devices have been developed as an aid to mechanics. One, as exemplified by the patent to Young U.S. Pat. No. 4,712,421 is a device for testing fuel injectors. It contains a fuel reservoir and a pump. But the fuel injectors have to be removed from the motor and the fuel spray pattern from the fuel injectors must be visually observed. However this device is different from the present invention. If for example the motor fuel pump or its attached electrical control system are defective, it would be a waste of time to have to remove and examine the fuel injector.

The patent to Gaenzler U.S. Pat. No. 3,745,818 is also limited to a device for locating problems in an motor using fuel injectors. The Gaenzler device is too complicated and expensive and time consuming to use, and if the problem is in the fuel pump or its connected electrical control system, the Gaenzler device is not useful at all. The patent to McLean U.S. Pat. No. 4,114,426 is a device for detecting a leak in a gasoline line between and above a ground dispensing device and an underground gasoline storage tank. This has no direct relationship to the problem applicant is concerned with.

The patent to Brown U.S. Pat. No. 3,577,776 is not related to the problem this invention is concerned with. It is a device for testing and calibrating a fuel pump for use in diesel motors. It cannot test fuel injectors or carburetor's electrical control systems connected to the fuel pump.

BRIEF DESCRIPTION OF OPERATION OF DIAGNOSTIC TOOL

To solve the problem the problem applicant is concerned with, the built in fuel supply intake line in the motor is disconnected from the motor, and an auxiliary fuel supply with its own auxiliary fuel pump is connected to the built in motor fuel supply line at the same fuel flow rate the motor receives during normal operation. Since the required fuel flow rate varies with each kind of motor, an adjustable valve and a fuel flow meter is used to make certain that the flow of fuel from the auxiliary supply during a diagnostic test conforms to the normal motor requirements. With this arrangement, when the auxiliary fuel pump is operating it pumps fuel into the fuel supply intake line in the motor. If the engine runs perfectly with the auxiliary fuel supply it indicates the problem is not with the carburetor or the fuel injectors, but instead with the motor fuel pump or its electrical control system. As a result the attention of the mechanic is quickly directed to these parts of the motor. However, if the motor still doesn't run, or run well with the auxiliary fuel supply and pump, the mechanic quickly knows there is a problem with the carburetor or the fuel injectors and he directs his attention to those parts of the motor. If the diagnostic tool is not to be portable, it can be connected to the normal fuel pump in gasoline stations by connecting an adjustable valve and a fuel flow gauge to the motor intake lines. If the diagnostic tool is to be portable an auxiliary fuel pump and adjustable valve and a fuel flow gauge must be attached by a suitable means to an auxiliary fuel tank. In either case, portable diagnostic tools are subjected to rough treatment because they are often dropped or bounced around in a truck. For that reason the adjustable valve and fuel flow gauge must be specially protected, because if they are damaged, the fuel flow into the fuel intake of may not be correct and this could cause an error in the diagnosis of the motor problem or even motor damage. As a result, the present fuel diagnostic tool is provided with means for protecting the adjustable valve and fuel flow gauge.

A principal object of this invention is to provide a simple to construct and easy to operate diagnostic tool for mechanics to enable the mechanic to quickly diagnose problems in fuel systems for motors with fuel injectors or carburetors.

Another object of this invention is to provide a portable simple to construct and easy to operate diagnostic tool for mechanics which is provided with an adjustable valve for controlling the flow of fuel and a fuel flow meter and which has means for protecting the valve and the fuel flow meter from injury due to rough handling.

Yet another object of this invention is to provide a portable diagnostic tool for mechanics comprising a portable fuel tank with an upper opening adapted to be closed by a closure cap which has an adjustable valve and a fuel flow meter mounted thereon, and which has arcuate lifting hand holds for lifting the fuel tank and which surround the adjustable valve and fuel flow meter to protect them from damage in case the tool falls over, or is dropped, or is bounced around on a truck.

These and other objects of this invention will become more apparent when better understood in the light of the accompanying drawing and specification wherein.

MODE FOR CARRYING OUT INVENTION

Figure 1:
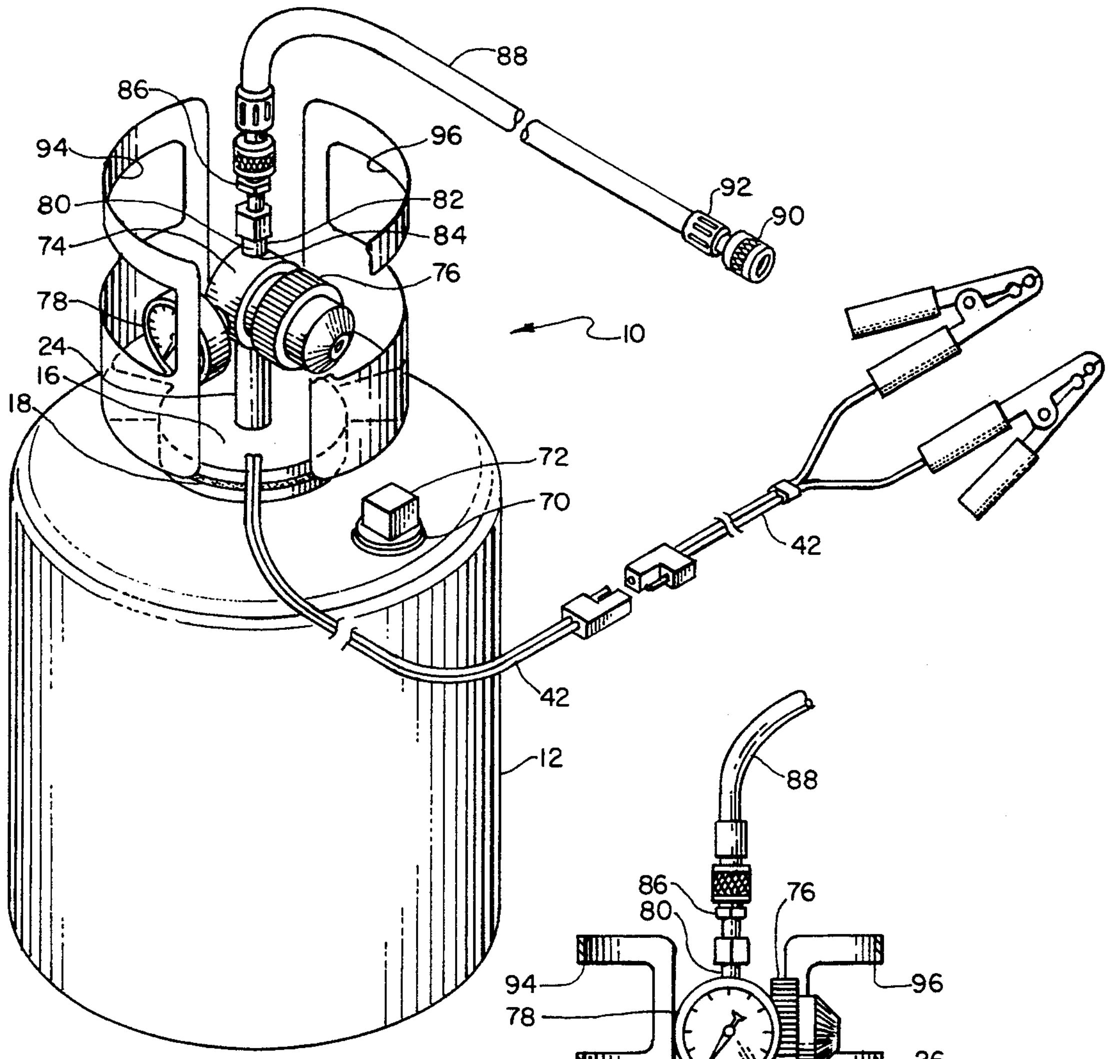
FIG. 1 is a perspective view of the portable diagnostic tool showing the electrical connections to the motor battery.

A diagnostic tool indicated generally by the reference numeral 10 comprises an auxiliary fuel tank 12. The tank 12 has an upper threaded cap receiving opening 14 and a bottom wall 68. A closure cap 16 is designed to be threaded onto the cap receiving opening 14 to close it off, as shown in FIG. 1. The tank is also provided with a fuel intake plug 72 so that the tank can be filled with fuel, or a solvent can be added to the tank, which when mixed with the fuel in the tank helps clean clogged fuel injectors or the engine fuel lines. To prevent leakage through the closure cap 16, a gasket 18 is mounted between the cap 16 and the rim 20 of the threaded cap opening 14 in the tank.

The closure cap 16 is provided with a centrally disposed conduit receiving opening 22 extending therethrough. A fuel pipe or conduit 24 having an upper end 26 and a lower end 28 extends through opening 24. The fuel pipe 24 is rigid and is made from metal or some other suitable material. This pipe is secured to the periphery of the central opening 22 in the cap by welding or other suitable means to prevent leakage around the pipe. The fuel pipe 24 extends both above the tank 12 to its upper end 26 and down into the tank to its lower end 28. The lower end 28 of the fuel pipe is connected by clamps 32 to the upper end 34 of a flexible hose 30 made of some suitable elastomeric material unaffected by fuel or the solvent used to clean fuel injectors. The lower end 36 of the hose is 30 is connected by the same kind of clamps 32 to the fuel outlet 62 of an electrically powered fuel pump 38 which in the embodiment shown in the drawing is mounted inside the tank.

The flexible hose 30 acts as a connector to the fuel pipe or conduit 24 to receive fuel pumped into it by the fuel pump 38.

The cap 16 has a second leak proof opening 40 sized to receive electric power lines 42 extending up from the fuel pump and going through the opening 40 in the cap 16 for connection to an electric power source, usually the motor battery.

A rigid support rod 44 having an upper end 46 and a lower end 47 is secured by any suitable means at its upper end 46 to the lower surface 48 of the closure cap 16. The intermediate part 50 and the lower end 52 of the support rod are clamped to the fuel pump 38 by means of clamps 54 and 56. This holds the fuel pump in a rigid position inside the tank 12 with respect to the closure cap 16, see FIG. 2. A fuel pump inlet 58 is formed in bottom part 60 of the fuel pump to receive the fuel that is to be pumped up and out through the fuel pump outlet 62 into the hose 30 and on into the conduit 24.

A fuel filter 64 is secured to the bottom part 60 of the fuel pump by any suitable means. The fuel pump 38 is mounted so the fuel filter is far enough from the bottom wall 68 of the tank 12 to prevent shocks caused by dropping the tank or by rough handling from injuring the fuel pump and the adjustable valve 74 and fuel flow meter 78.

Figure 2:
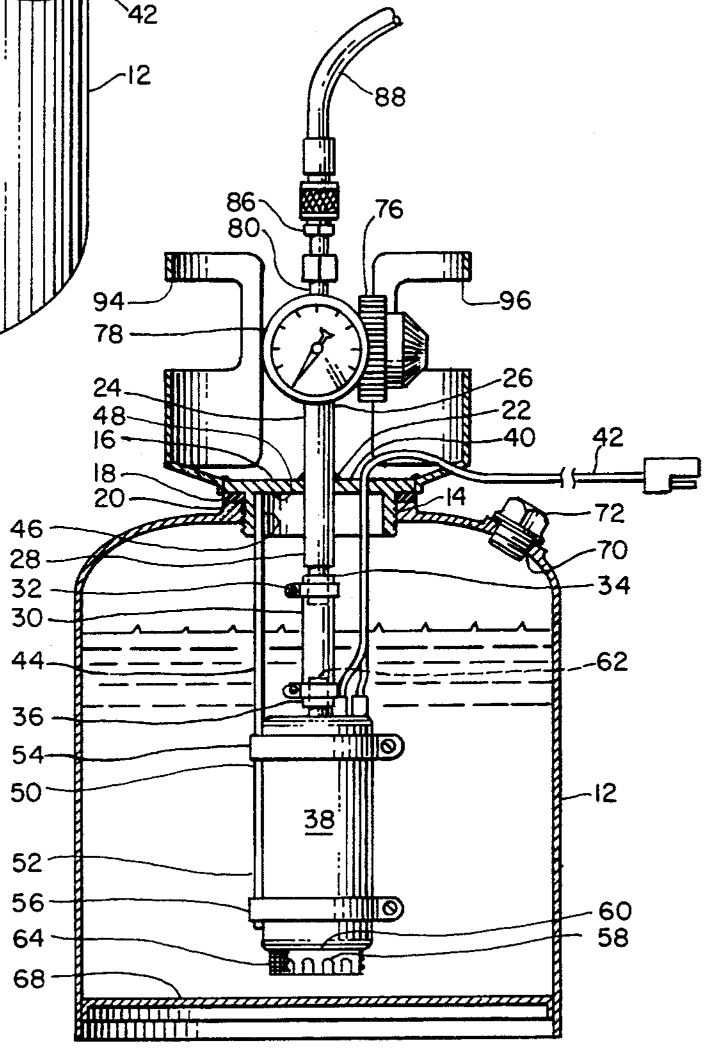
FIG. 2 is a elevational sectional view of the portable diagnostic tool shown in FIG. 1.

A tank fuel inlet opening 70 is formed in the upper part of the tank for filling the tank with fuel or adding a solvent to the fuel for cleaning obstructions in the fuel supply system of the motor, as shown in FIGS. 1 and 2. This opening is closed off by a threaded closure plug 72.

The upper part 26 of the fuel pipe or conduit 24 serves as a support for the adjustable valve 74 which is controlled by a valve control knob 76. In addition a fuel flow meter 78 is connected to the adjustable valve 74, see FIGS. 1 and 2. In this way by operating the valve control knob 76, the fuel flow to the built-in motor fuel supply line can be adjusted by observing the fuel flow meter 78 until the flow of fuel to the motor fuel supply line 88 is the same as the flow of fuel into the motor in normal motor operation.

One end 80 of a fuel outlet tube 82 is connected to the fuel outlet opening 84 in valve 74. The opposite end 86 of the fuel outlet tube is connected to one end of a flexible fuel line 88 by any suitable connector. A connector 90 is secured to the opposite end 92 of the flexible fuel line for connection to the motor fuel supply line.

Upstanding arcuate tank lifting hand holds 94 and 96 are secured to the upper end of the closure cap 16 and surround the adjustable fuel valve 74 and the fuel flow meter 78. These hand holds serve two functions. One is to help lift the tank 12 when it is filled with fuel, and the other is to protect the valve 74, the valve control knob 76 and the fuel flow meter 78 in case the tank tips over or is subjected to rough handling.

In operation when a motor problem is to be diagnosed the motor fuel pump inlet to the motor fuel supply line is disconnected and is replaced by the connector 90 at the opposite end 92 of the flexible fuel line 88. Then connectors at the end of the electric wires 42 connected to the fuel pump are attached to the motor battery enabling the fuel pump 38 inside the tank 12 to operate. The motor is started and the valve control knob 76 is adjusted until the fuel pump 38 causes the proper amount of fuel to enter the motor fuel supply line. If the motor still operates properly, the mechanic immediately knows the problem is probably in the motor fuel pump or the electrical system connected to the fuel pump. On the other hand, if the motor still does not operate correctly, the mechanic knows the problem is in the fuel injectors or the carburetor so he can quickly direct his attention to the problem in the motor.

Having described the invention what I claim as new is:

1. A portable diagnostic tool for distinguishing problems in an internal combustion motor caused by defects in the carburetor or the fuel injectors from problems caused by the motor fuel pump and its related components, comprising a tank holding an auxiliary fuel supply for said motor, a fuel pump mounted in the tank, said tank having an upper cap receiving opening and a bottom wall, a leak proof closure cap connected to and covering said opening for closing it off, a conduit, a conduit receiving opening extending through said closure cap, said conduit having an upper end and a lower end, the lower end of said conduit connected to said fuel pump in said tank, the upper end of said conduit extending through said conduit receiving opening in said closure cap and adapted to be connected to the fuel lines of the motor, a continuously adjustable valve and a fuel flow meter mounted on said closure cap, said fuel flow meter connected to said adjustable valve for indicating the fuel flow through said valve, said conduit extending through said adjustable valve to the fuel lines of the motor, whereby the said valve can be adjusted while the motor is operating until the fuel flow meter indicates that the fuel flow through said adjustable valve and conduit to said motor using the diagnostic tool is the same as the fuel flow into the motor when the motor is operating without the diagnostic tool.

2. The diagnostic tool described in claim 1 including arcuate upstanding-hand holds mounted said closure cap for lifting said tank when the closure cap is attached to said tank, said arcuate hand holds positioned so they surround the adjustable valve and fuel flow meter to protect them from damage in case the tank or closure cap is dropped or subjected to rough handling.

3. The diagnostic tool described in claim 2 including a fuel filter, said fuel filter mounted at the fuel inlet of said fuel pump inside said tank to prevent contaminated fuel from reaching the motor being diagnosed, said fuel pump and said fuel filter spaced far enough from the bottom wall of said tank so that if the tank is dropped the impact will not damage the fuel pump or the fuel filter.

4. A method for distinguishing problems in an internal combustion engine caused by defects in the carburetor or fuel injectors from problems caused by the motor fuel pump and its related components comprising the steps of disconnecting motor fuel inlet conduits from the motor and replacing them with auxiliary fuel conduits connected to an auxiliary fuel supply, pumping fuel through the auxiliary fuel conduits at the same flow rate as the motor receives in normal operation, then operating the motor and observing whether the motor now operates correctly indicating that the problem is in the fuel pump and its related components or still has,-problems even when the motor receives fuel from the auxiliary fuel supply is connected to it, indicating the problem is in the carburetor or fuel injectors.

5. In a portable diagnostic tool for distinguishing problems in an internal combustion engine caused by defects in the carburetor or the fuel injectors from problems caused by the motor fuel pump and its related components and having an auxiliary fuel tank with an opening in the top of the tank, a closure cap for closing an opening in the top of said auxiliary fuel tank, a conduit receiving opening extending through said closure cap, a continuously adjustable valve and a fuel flow meter mounted on the closure cap, arcuate upstanding lifting hand holds mounted on the closure cap surrounding the adjustable valve and the fuel flow meter both to help lift fuel tank and to protect the adjustable valve and the fuel flow meter in case the closure cap is dropped or is subjected to rough handling.

* * * * *